(12) United States Patent
Zhang et al.

(10) Patent No.: US 12,709,986 B1
(45) Date of Patent: Aug. 18, 2026

(54) AXIAL COMPRESSOR INTEGRATED BLADED ROTOR AIRFOIL DESIGN SCHEME

(71) Applicant: Pratt & Whitney Canada Corp., Longueuil (CA)

(72) Inventors: Chao Zhang, Vaughan (CA); Rambod Larijani, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/204,109

(22) Filed: May 9, 2025

(51) Int. Cl.
*F01D 5/34* (2006.01)
*F02C 3/06* (2006.01)
*F04D 29/32* (2006.01)

(52) U.S. Cl.
CPC .................. *F01D 5/34* (2013.01); *F02C 3/06* (2013.01); *F04D 29/322* (2013.01); *F05D 2240/80* (2013.01)

(58) Field of Classification Search
CPC .......................................................... F01D 5/34
See application file for complete search history.

(56) References Cited

U.S. PATENT DOCUMENTS 5,037,273 A * 8/1991 Krueger .................. F01D 11/08 416/190
6,158,962 A * 12/2000 Lee ........................ F01D 5/141 416/193 A
6,991,428 B2 1/2006 Crane
7,037,078 B2 * 5/2006 Soupizon .................. F01D 5/26 416/193 A
9,243,501 B2 * 1/2016 Thomen ................ F01D 5/3007
9,441,636 B2 9/2016 Dodds et al.
9,598,967 B2 * 3/2017 Xu ........................ F01D 5/3092
10,995,768 B2 5/2021 Johann
12,049,834 B2 7/2024 Ertl et al.
12,188,371 B1 1/2025 Savard et al.

FOREIGN PATENT DOCUMENTS

GB 802666 A 10/1958
GB 802667 A 10/1958

* cited by examiner

*Primary Examiner* — Christopher R Legendre
(74) *Attorney, Agent, or Firm* — CANTOR COLBURN LLP

(57) ABSTRACT

An integrally bladed rotor (IBR) of an aircraft engine includes a hub, the hub including a blade platform and a hub web extending radially inwardly from the blade platform. The IBR further includes blades, each blade having an airfoil section extending from the blade platform to a blade tip defining a radially outboard extent of the rotor blade to aerodynamically interact with a flow of air for compressing the air. A root fillet is integrally formed with the blade platform and the airfoil section integrally extends therefrom. The blade platform includes a radially outer surface from which each blade extends and a radially inner surface radially offset from the radially outer surface defining a platform thickness between the radially outer surface and the radially inner surface. The platform thickness is locally increased at a hub web intersection with the blade platform.

17 Claims, 3 Drawing Sheets

AXIAL COMPRESSOR INTEGRATED BLADED ROTOR AIRFOIL DESIGN SCHEME

FIELD

The present disclosure relates gas turbine engines and, more particularly, to integrally bladed rotors (IBRs) of gas turbine engines.

BACKGROUND

A turbine is used to generate power for propulsion, in some cases, by turning propellors, fans or helicopter blades through a gearbox. In a gas turbine engine, fuel and compressed oxygen are combusted in a combustor to produce a high-temperature and high-pressure fluid. This fluid enters a turbine and interacts with rows or stages of turbine blades and vanes. This interaction causes the stages of turbine blades to rotate a shaft. The shaft rotation drives a compressor to compress the oxygen for the combustor and, as noted above, can be used to drive operations of a generator to produce electricity or for propulsion.

Within the compressor, inlet air is partially compressed by flowing through a series of interleaved compressor vane stages and compressor blade stages. The compressor vane stages can be stationary whereas each of the compressor blade stages rotates as a singular element about a rotational axis of the gas turbine engine. In some cases, each compressor blade stage can be provided as an IBR in which a rotor hub and blades as assembled as a single part with the blades being integrally formed with the hub.

SUMMARY

In one embodiment, an integrally bladed rotor (IBR) of an aircraft engine includes a hub, the hub including a blade platform and a hub web extending radially inwardly from the blade platform. The IBR further includes blades, each blade having an airfoil section extending from the blade platform to a blade tip defining a radially outboard extent of the rotor blade to aerodynamically interact with a flow of air for compressing the air. A root fillet is integrally formed with the blade platform and the airfoil section integrally extends therefrom. The blade platform includes a radially outer surface from which each blade extends and a radially inner surface radially offset from the radially outer surface defining a platform thickness between the radially outer surface and the radially inner surface. The platform thickness is locally increased at a hub web intersection with the blade platform.

Additionally or alternatively, in this or other embodiments the localized increased platform thickness is centered on and extends axially from a web centerline of the hub web.

Additionally or alternatively, in this or other embodiments the localized increased platform thickness extends axially in a range of 50% to 70% of an axial chord length of the blades.

Additionally or alternatively, in this or other embodiments the platform thickness is locally increased by in a range of 50% to 100% compared to one of a leading edge platform thickness and a trailing edge platform thickness.

Additionally or alternatively, in this or other embodiments a hub web axial thickness is locally increased at the hub web intersection with the blade platform.

Additionally or alternatively, in this or other embodiments the localized increase of hub web axial thickness extends radially inwardly along a range of 10% to 30% of a radial hub web length.

Additionally or alternatively, in this or other embodiments the localized increase of hub web axial thickness is axial centered on a web centerline of the hub web.

In another embodiment compressor assembly of a gas turbine engine of an aircraft, comprising one or more compressor rotors arrayed along an engine central longitudinal axis, at least one compressor rotor of the one or more compressor rotors an integrally bladed rotor (IBR). The IBR includes a hub, the hub including a blade platform and a hub web extending radially inwardly from the blade platform. The IBR further includes blades, each blade having an airfoil section extending from the blade platform to a blade tip defining a radially outboard extent of the rotor blade to aerodynamically interact with a flow of air for compressing the air. A root fillet is integrally formed with the blade platform and the airfoil section integrally extends therefrom. The blade platform includes a radially outer surface from which each blade extends and a radially inner surface radially offset from the radially outer surface defining a platform thickness between the radially outer surface and the radially inner surface. The platform thickness is locally increased at a hub web intersection with the blade platform.

Additionally or alternatively, in this or other embodiments the localized increased platform thickness is centered on and extends axially from a web centerline of the hub web.

Additionally or alternatively, in this or other embodiments the localized increased platform thickness extends axially in a range of 50% to 70% of an axial chord length of the blades.

Additionally or alternatively, in this or other embodiments the platform thickness is locally increased by in a range of 50% to 100% compared to one of a leading edge platform thickness and a trailing edge platform thickness.

Additionally or alternatively, in this or other embodiments a hub web axial thickness is locally increased at the hub web intersection with the blade platform.

Additionally or alternatively, in this or other embodiments the localized increase of hub web axial thickness extends radially inwardly along a range of 10% to 30% of a radial hub web length.

Additionally or alternatively, in this or other embodiments the localized increase of hub web axial thickness is axial centered on a web centerline of the hub web.

In yet another embodiment, a gas turbine engine of an aircraft includes a turbine driven by products of a combustor and a compressor operably connected to the turbine and driven by rotation of the turbine. The compressor includes an integrally bladed rotor (IBR). T The IBR includes a hub, the hub including a blade platform and a hub web extending radially inwardly from the blade platform. The IBR further includes blades, each blade having an airfoil section extending from the blade platform to a blade tip defining a radially outboard extent of the rotor blade to aerodynamically interact with a flow of air for compressing the air. A root fillet is integrally formed with the blade platform and the airfoil section integrally extends therefrom. The blade platform includes a radially outer surface from which each blade extends and a radially inner surface radially offset from the radially outer surface defining a platform thickness between the radially outer surface and the radially inner surface. The platform thickness is locally increased at a hub web intersection with the blade platform.

Additionally or alternatively, in this or other embodiments the localized increased platform thickness is centered on and extends axially from a web centerline of the hub web.

Additionally or alternatively, in this or other embodiments the localized increased platform thickness extends axially in a range of 50% to 70% of an axial chord length of the blades.

Additionally or alternatively, in this or other embodiments the platform thickness is locally increased by in a range of 50% to 100% compared to one of a leading edge platform thickness and a trailing edge platform thickness.

Additionally or alternatively, in this or other embodiments a hub web axial thickness is locally increased at the hub web intersection with the blade platform.

Additionally or alternatively, in this or other embodiments the localized increase of hub web axial thickness is axial centered on a web centerline of the hub web.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
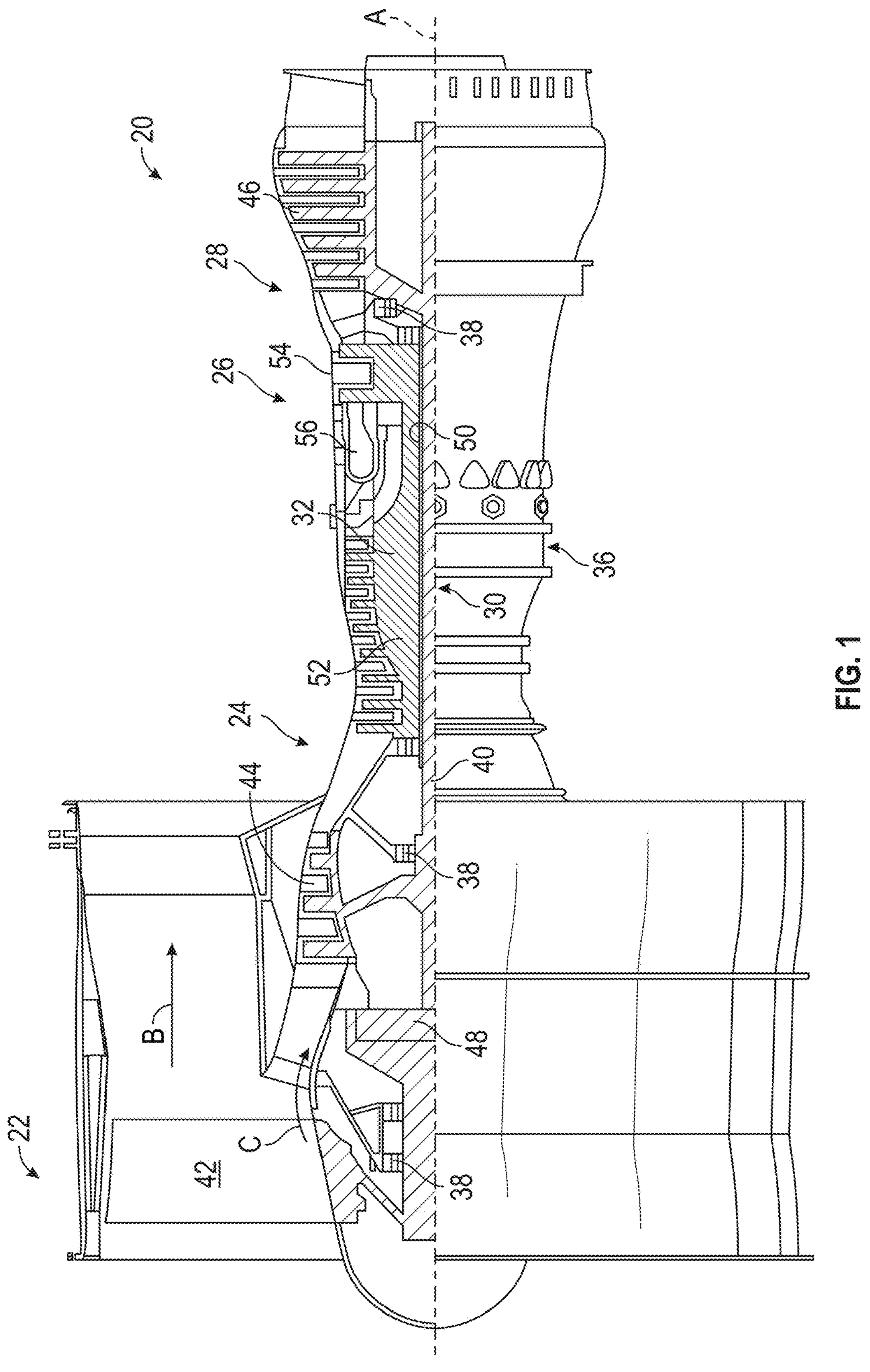
FIG. 1 is a partial cross-sectional view of an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

Figure 2:
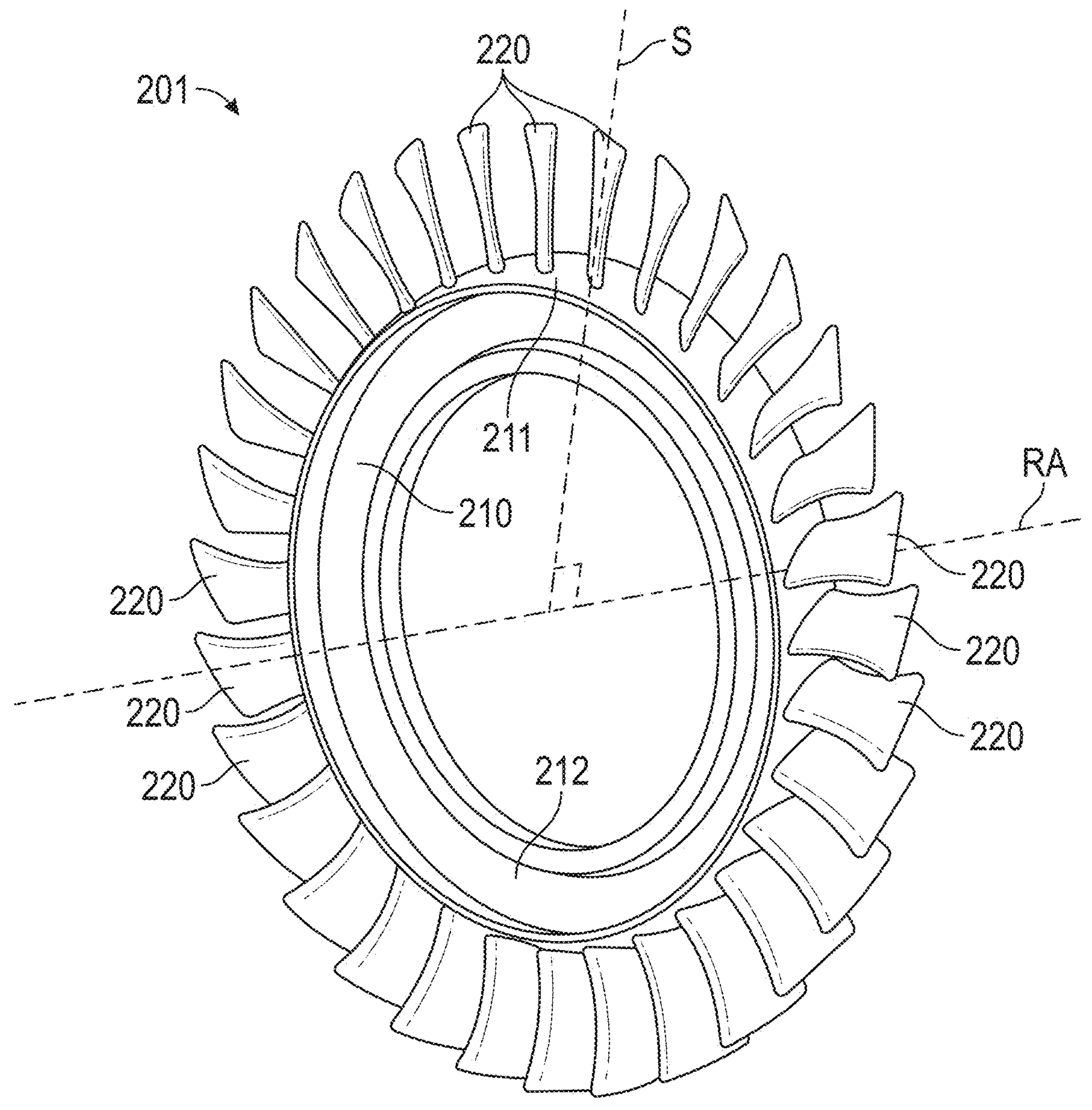
FIG. 2 is a perspective view of an exemplary embodiment of an IBR of a compressor section of the gas turbine engine of FIG. 1.

With reference to FIG. 2, an IBR 201 is provided for use in at least the compressor section 24 of the gas turbine engine 20 of FIG. 1. The IBR 201 includes a hub 210 and non-removable, circumferentially arranged rotor blades (hereinafter referred to as "blades") 220 that radially extend from the hub 210. The blades 220 can be integrally formed with the hub 210 so that the IBR 201 may be devoid of individual releasable blade attachments between the blades 220 and the hub 210. The IBR 201 may be referred to as a blade disk ("blisk") or a bladed ring ("bling"). The hub 210 and the entire IBR 201 may have rotation axis RA and the hub 210 may include a platform 211 defining a part of the core flow path C of FIG. 1. The blades 220 may extend radially outwardly from the platform 211. The hub 210 additionally includes a hub web 212 that extends radially inboard from the platform 211. Exemplary airfoil stacking line S is a reference line designating a position in space of a planar cross sections of a blade 220. The airfoil stacking line S may extend radially from rotation axis RA and may provide a frame of reference for a corresponding one of the blades 220.

Figure 3:
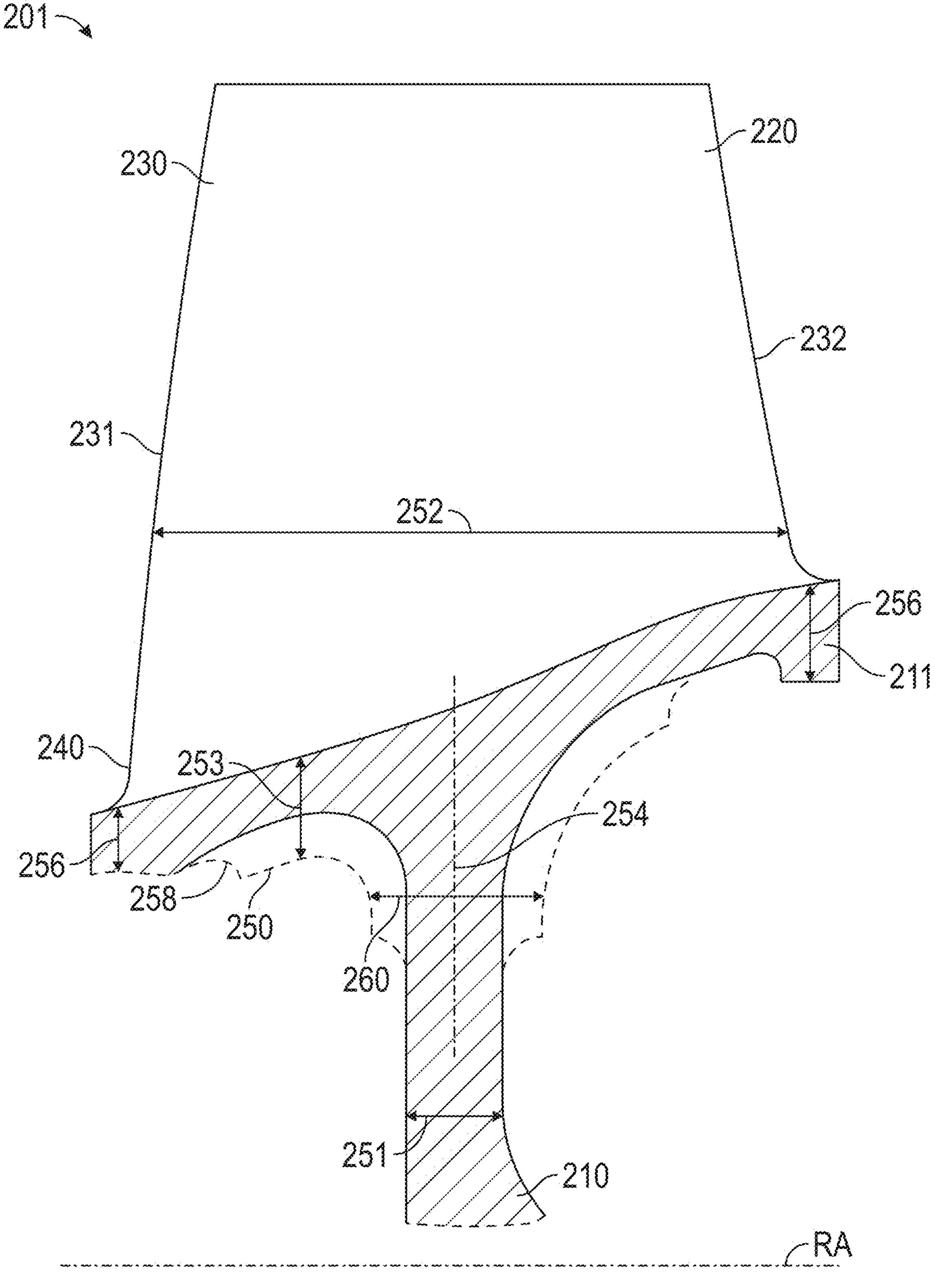
FIG. 3 is a partial cross-sectional view of an exemplary embodiment of an IBR of a compressor section of the gas turbine engine of FIG. 1.

Referring now to FIG. 3, each of the blades 220 includes an airfoil section 230 to aerodynamically interact with a flow of air for compressing the air, a root fillet 240 integrally formed with the platform 211 of the hub 210 and from which the airfoil section 230 integrally extends along a radial dimension. The airfoil section 230 includes a leading edge 231, a trailing edge 232 and opposed concave (pressure) and convex (suction) surfaces extending between the leading edge 231 and the trailing edge 232. In a typical IBR 201, an axial hub width 251 at the hub web 212 is much smaller than an axial blade chord length 252 to reduce weight of the IBR 201. As a consequence, centrifugal loads caused by the mass around the leading edge 231 and the trailing edge 232 converge on the platform 211 at or near a mid-chord location, and the stresses at the mid-chord root fillet 240 on the concave side of the blade 220 is significantly higher than the stresses at the leading edge 231 and the trailing edge 232.

To reduce or mitigate this stress concentration at the root fillet 240 of the concave side of the blade 220, the platform 211 is locally thickened by moving a radially inboard platform surface 250 radially toward the rotation axis RA. This increased platform thickness 253 is centered on a web centerline 254 of the hub web 212 and extends axially in some embodiments in the range of 50% to 70% of a blade root axial chord length 252. In some embodiments, the platform thickness 253 in this region is increased by an amount in the range of 50% to 100% of a leading edge or trailing edge platform thickness 256. From the increased platform thickness 253, one or more platform transition fillets 258 may be included to transition to the platform thickness 256. In some embodiments, the increased thickness 253 smoothly transitions at the hub web 212 as an increased web thickness 260. This increased web thickness 260 extends radially inwardly partially along the hub web 212, in some embodiments in the range of 10% to 30% of a web radial length. In the illustrated embodiment, the web thickness is increased by a same amount as the platform thickness, while in other embodiments the increase in web thickness may be greater than or less than the increase in platform thickness. Further, in the embodiment illustrated the web thickness is increased on both axial sides of the hub web 212. In other embodiments, however, the web thickness may be increased at only one axial side of the hub web 212. While in some embodiments the increased thickness 253 and the increased web thickness 260 is constant, in other embodiments the increased thickness 253 may vary along its axial length. Similarly, the increased web thickness 260 may vary along its radial length.

Locally increasing the thickness of the platform 211 and the hub web 212 acts to axially widen a centrifugal load bath of the IBR 201, thereby reducing peak stresses on the concave side blade root fillet 240, thereby improving the service life of the IBR 201.

The term "about" is intended to include the degree of error associated with measurement of the particular quantity based upon the equipment available at the time of filing the application. For example, "about" can include a range of +8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An integrally bladed rotor (IBR) of an aircraft engine, comprising:
- a hub, the hub including:
  - a blade platform; and
  - a hub web extending radially inwardly from the blade platform; and
  - blades, each blade comprising:
    - an airfoil section extending from the blade platform to a blade tip defining a radially outboard extent of the rotor blade to aerodynamically interact with a flow of air for compressing the air; and
    - a root fillet integrally formed with the blade platform and from which the airfoil section integrally extends;
  - wherein the blade platform includes:
    - a radially outer surface from which each blade extends; and
    - a radially inner surface radially offset from the radially outer surface defining a platform thickness between the radially outer surface and the radially inner surface;
  - wherein the platform thickness is locally increased at a hub web intersection with the blade platform, defining an increased platform thickness portion, a platform fillet defined at an end of the increased platform thickness portion;
  - wherein a hub web axial thickness is locally increased at the hub web intersection with the blade platform, defining an increased web thickness portion, a web fillet defined at an end of the increased web thickness portion;
  - wherein the local increase in platform thickness equals the local increase in hub web axial thickness between the platform fillet and the web fillet.

2. The IBR of claim 1, wherein the localized increased platform thickness is centered on and extends axially from a web centerline of the hub web.

3. The IBR of claim 1, wherein the localized increased platform thickness extends axially in a range of 50% to 70% of an axial chord length of the blades.

4. The IBR of claim 1, wherein the platform thickness is locally increased by 50% to 100% compared to one of a leading edge platform thickness and a trailing edge platform thickness.

5. The IBR of claim 1, wherein the localized increase of hub web axial thickness extends radially inwardly along a range of 10% to 30% of a radial hub web length.

6. The IBR of claim 1, wherein the localized increase of the hub web axial thickness is axially centered on a web centerline of the hub web.

7. A compressor assembly of a gas turbine engine of an aircraft, comprising one or more compressor rotors arrayed along an engine central longitudinal axis, at least one compressor rotor of the one or more compressor rotors is an integrally bladed rotor (IBR) including:
- a hub, the hub including:
  - a blade platform; and
  - a hub web extending radially inwardly from the blade platform; and
  - blades, each blade comprising:
    - an airfoil section extending from the blade platform to a blade tip defining a radially outboard extent of the rotor blade to aerodynamically interact with a flow of air for compressing the air; and
    - a root fillet integrally formed with the blade platform and from which the airfoil section integrally extends;
  - wherein the blade platform includes:
    - a radially outer surface from which each blade extends; and
    - a radially inner surface radially offset from the radially outer surface defining a platform thickness between the radially outer surface and the radially inner surface;
  - wherein the platform thickness is locally increased at a hub web intersection with the blade platform, defining an increased platform thickness portion, a platform fillet defined at an end of the increased platform thickness portion;

wherein a hub web axial thickness is locally increased at the hub web intersection with the blade platform, defining an increased web thickness portion, a web fillet defined at an end of the increased web thickness portion;

wherein the local increase in platform thickness equals the local increase in hub web axial thickness between the platform fillet and the web fillet.

8. The compressor assembly of claim 7, wherein the localized increased platform thickness is centered on and extends axially from a web centerline of the hub web.

9. The compressor assembly of claim 7, wherein the localized increased platform thickness extends axially in a range of 50% to 70% of an axial chord length of the blades.

10. The compressor assembly of claim 7, wherein the platform thickness is locally increased by 50% to 100% compared to one of a leading edge platform thickness and a trailing edge platform thickness.

11. The compressor assembly of claim 7, wherein the localized increase of hub web axial thickness extends radially inwardly along a range of 10% to 30% of a radial hub web length.

12. The compressor assembly of claim 7, wherein the localized increase of the hub web axial thickness is axially centered on a web centerline of the hub web.

13. A gas turbine engine of an aircraft, comprising:

a turbine driven by products of a combustor; and a compressor operably connected to the turbine and driven by rotation of the turbine, the compressor including an integrally bladed rotor (IBR), the IBR including:

a hub, the hub including:

a blade platform; and a hub web extending radially inwardly from the blade platform; and blades, each blade comprising:

an airfoil section extending from the blade platform to a blade tip defining a radially outboard extent of the rotor blade to aerodynamically interact with a flow of air for compressing the air; and a root fillet integrally formed with the blade platform and from which the airfoil section integrally extends;

wherein the blade platform includes:

a radially outer surface from which each blade extends; and a radially inner surface radially offset from the radially outer surface defining a platform thickness between the radially outer surface and the radially inner surface;

wherein the platform thickness is locally increased at a hub web intersection with the blade platform, defining an increased platform thickness portion, a platform fillet defined at an end of the increased platform thickness portion;

wherein a hub web axial thickness is locally increased at the hub web intersection with the blade platform, defining an increased web thickness portion, a web fillet defined at an end of the increased web thickness portion;

wherein the local increase in platform thickness equals the local increase in hub web axial thickness between the platform fillet and the web fillet.

14. The gas turbine engine of claim 13, wherein the localized increased platform thickness is centered on and extends axially from a web centerline of the hub web.

15. The gas turbine engine of claim 13, wherein the localized increased platform thickness extends axially in a range of 50% to 70% of an axial chord length of the blades.

16. The gas turbine engine of claim 13, wherein the platform thickness is locally increased by 50% to 100% compared to one of a leading edge platform thickness and a trailing edge platform thickness.

17. The gas turbine engine of claim 13, wherein the localized increase of the hub web axial thickness is axially centered on a web centerline of the hub web.

* * * * *